United States Patent [19]

Riemersma

[11] 4,400,227

[45] Aug. 23, 1983

[54] DYNAMIC ULTRASONIC LAMINATING APPARATUS HAVING POST-BONDING PRESSURE ROLL, AND CONCOMITANT METHOD

[75] Inventor: Coenraad E. Riemersma, Cincinnati, Ohio

[73] Assignee: The Procter & Gamble Company, Cincinnati, Ohio

[21] Appl. No.: 342,699

[22] Filed: Jan. 26, 1982

[51] Int. Cl.³ ................ B29C 27/08; B32B 31/20
[52] U.S. Cl. .................... 156/73.1; 156/290;
156/308.4; 156/324; 156/553; 156/555;
156/580.1; 156/580.2; 156/582; 264/23;
425/174.2
[58] Field of Search ............... 156/73.1, 181, 296,
156/553, 555, 580.1, 580.2, 582, 290, 308.4, 324;
264/23; 228/1 R; 425/174.2

[56] References Cited

U.S. PATENT DOCUMENTS

| | | | |
|---|---|---|---|
| 2,961,361 | 11/1960 | Dennis | 156/181 |
| 3,531,361 | 9/1970 | Grandinetti | 156/582 |
| 3,575,752 | 4/1971 | Carpenter | 156/181 |
| 3,844,869 | 10/1974 | Rust, Jr. | 156/580.1 |
| 3,855,045 | 12/1974 | Brock | 156/181 |
| 3,939,033 | 2/1976 | Grgach | 156/580.2 |
| 4,246,058 | 1/1981 | Reed | 156/553 |
| 4,247,273 | 1/1981 | Pogrzeba et al. | 264/23 |

FOREIGN PATENT DOCUMENTS 1957216  5/1971  Fed. Rep. of Germany ... 156/580.1

Primary Examiner—Michael G. Wityshyn
Attorney, Agent, or Firm—Thomas J. Slone; Fredrick H. Braun; Richard C. Witte

[57] ABSTRACT

An improved method and apparatus for bonding together juxtaposed webs which are subject to being ultrasonically bonded together such as, for example, thermoplastic films or non-woven thermoplastic webs or elastomeric films to form a laminate as the webs are being driven forward at a relatively high velocity. The apparatus includes an ultrasonic horn and a power-rotated anvil cylinder which define a bonding passageway therebetween, and a rotatable pressure roll which is biased towards the anvil adjacent the downstream end of the bonding passageway to apply a predetermined level of compressive force to the bonded regions of the laminate issuing from the passageway before the bonds in the bonded regions become fully set upon cooling. In a preferred apparatus embodiment of the invention the anvil has a relief-type bonding pattern on its circumferential surface; and the pressure roll is sufficiently rigid and so configured and disposed that substantially only the portions of the laminate juxtaposed raised elements of the bonding pattern are subjected to such post-bonding compression.

8 Claims, 6 Drawing Figures ial cylinder  # DYNAMIC ULTRASONIC LAMINATING APPARATUS HAVING POST-BONDING PRESSURE ROLL, AND CONCOMITANT METHOD

TECHNICAL FIELD

This invention pertains to ultrasonically bonding together webs—particularly thin webs—to form a laminate thereof which webs are, corporately, subject to being ultrasonically bonded together. Such webs include, for example, fibrous non-wovens of such materials as polyesters, and polypropylene; thermoplastic films such as polyethylene; and elastomeric films comprising such materials as butadiene/styrene copolymers. More particularly, this invention pertains to such ultrasonic laminating which is effected on-the-fly: that is, while the webs are being forwarded in juxtaposed relation at a relatively high velocity.

BACKGROUND ART

Prior ultrasonic bonding apparatuses include apparatuses for converting web or sheet materials into laminates on-the-fly with predetermined patterns of bonded regions. Such apparatuses are disclosed, for example, in U.S. Pat. No. 3,562,041—Robertson; and U.S. Pat. No. 3,733,238-Long et al.

While the background art discloses methods and apparatus which have been developed to overcome some of the problems of ultrasonically bonding webs to convert them into laminates—particularly pattern bonded laminates—the discovered background art has not solved all of the problems associated with such web laminating in the manner of nor to the extent of the present invention. In particular, but not intending to thereby limit the scope of the present invention, providing post-bonding compression to the ultrasonically bonded regions of the laminate prior to their becoming fully set upon cooling.

DISCLOSURE OF THE INVENTION

In accordance with one aspect of the invention, an improved method is provided for dynamically ultrasonically bonding a plurality of webs together while they are being forwarded in juxtaposed relation along a predetermined path at a predetermined velocity, and which webs are subject to being ultrasonically bonded to form a laminate having bonded regions. The method comprises the step of subjecting the portions of the webs which have been ultrasonically bonded to post-bonding compression prior to the ultrasonic bonds becoming fully set upon cooling. Such post-bonding compression is preferably applied to only the bonded regions of the laminate. In a preferred apparatus embodiment, a relatively non-deformable, rotatably mounted pressure roll is provided which is biased towards the anvil of the apparatus adjacent the downstream end of the ultrasonic bonding passageway of the apparatus.

BRIEF DESCRIPTIONS OF THE DRAWINGS

While the specification concludes with claims particularly pointing out and distinctly claiming the subject matter regarded as forming the present invention, it is believed the invention will be better understood from the following description taken in conjunction with the accompanying drawings in which:

DETAILED DESCRIPTION OF THE INVENTION

Figure 1:
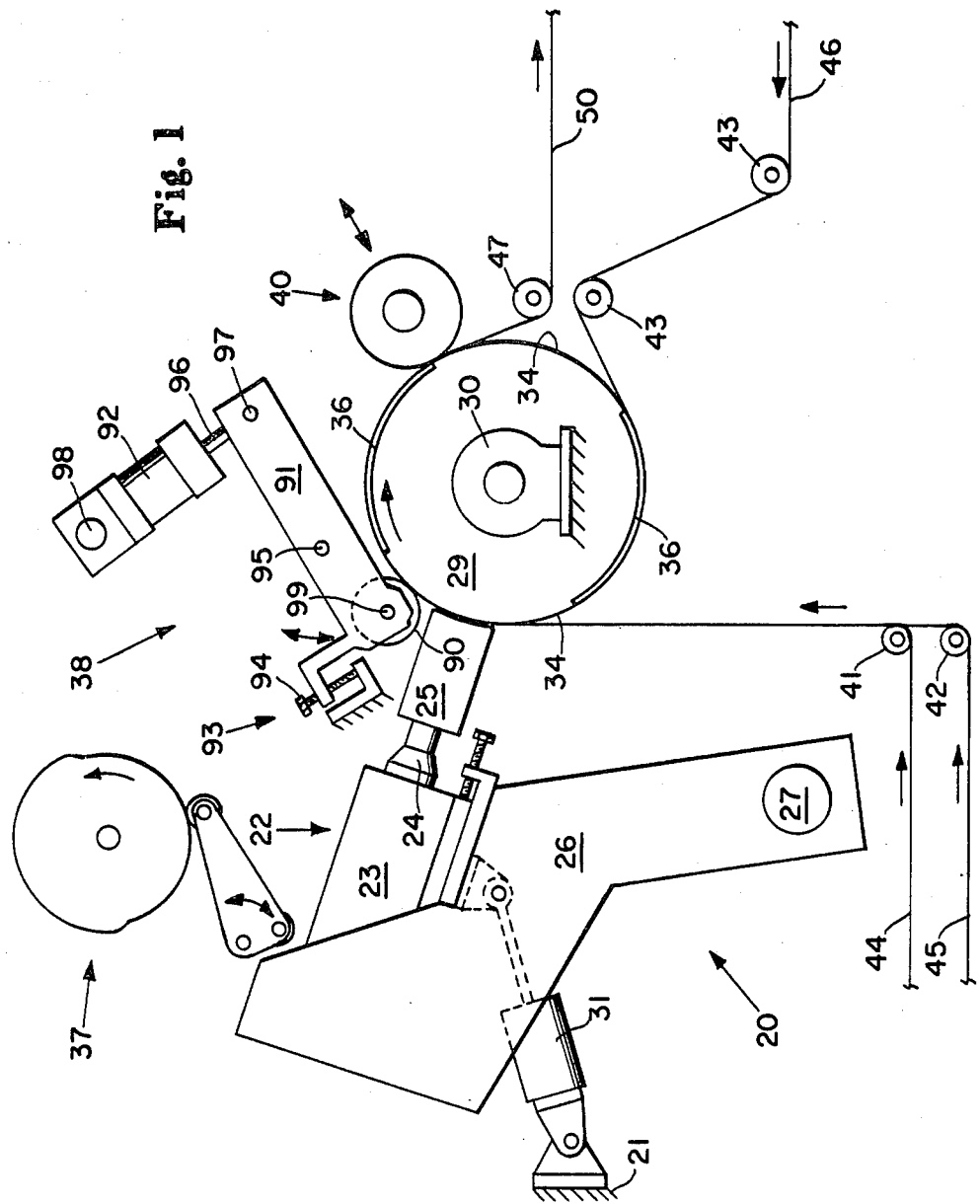
FIG. 1 is a partially schematic, fragmentary side elevational view of an apparatus embodiment of the present invention.

An exemplary web laminating apparatus 20 embodying the present invention is shown in FIG. 1 to include a frame 21 (only part of which is shown); an ultrasonic power device 22 comprising an ultrasonic transducer 23, amplifier 24, and ultrasonic horn 25; a pivotally mounted frame assembly 26 pivoted on bearing 27 and upon which the ultrasonic power device 22 is mounted; a rotatably mounted anvil cylinder 29 having relief-type patterned areas 34, and non-bond inducing areas 36; anvil drive means 30; actuator means 31 for biasing the ultrasonic horn 25 towards the anvil cylinder 29; camming means 37 for spacing the ultrasonic horn 25 outwardly from the anvil cylinder 29 while the non-bond patterned areas 36 of the anvil cylinder 29 pass the ultrasonic horn 25; post-bonding compression means 38; tension isolating means 40; guide rolls 41, 42 and 43 for guiding three webs 44, 45 and 46 onto the anvil cylinder 29; and guide roll 47 for guiding the laminated web 50 to downstream ancillary apparatus such as, for instance, reeling means not shown. The apparatus may further include means for forwarding the webs under controlled tension, which means are well known to persons of ordinary skill in the art, and which means are not shown for the purpose of enhancing the clarity of FIG. 1.

Briefly, when the exemplary apparatus 20, FIG. 1, is operated, webs 44, 45 and 46 which are subject to being ultrasonically bonded together are forwarded onto the power-rotated anvil cylinder 29; pass through a pressure biased, ultrasonic bonding passageway between the ultrasonic horn 25 and the anvil cylinder 29 where they are subjected to ultrasonic vibrational energy whereupon predetermined patterned regions of the webs become bonded regions in laminate 50; the bonded regions of laminate 50 are subjected to post-bonding compression by means 38 to enhance the bonds; and the portion of laminate 50 disposed on anvil cylinder 29 may be isolated from downstream tension by means 40.

Figure 2:
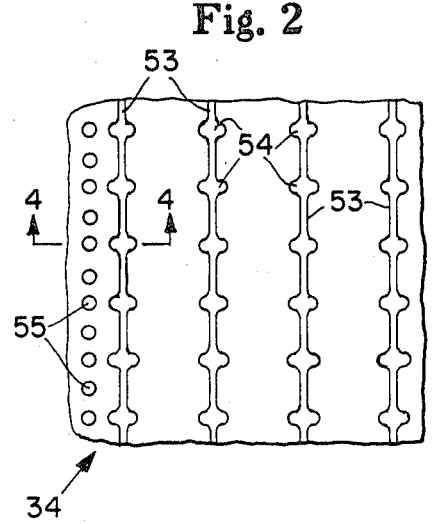
FIG. 2 is an enlarged scale, fragmentary plan view of elements of a representative, relief type bonding pattern disposed on the cylindrical surface of the anvil cylinder of the apparatus shown in FIG. 1.

FIG. 2 is a fragmentary plan view of a relief-type patterned area 34 of anvil cylinder 29, FIG. 1. Pattern elements 53 are elongate in the machine-direction and have wide regions 54 spaced apart in the machine direction. Pattern elements 55 are spaced in the machine direction and have disc-shape faces. Pattern elements 53 and 55 define a relief-type pattern by virtue of extending radially outwardly from the remainder of the surface 56 of the patterned portion 34 of anvil cylinder 29; and are preferably made integrally with anvil cylinder 29 but may alternatively be discretely made and then secured to surface 56.

Figure 3:
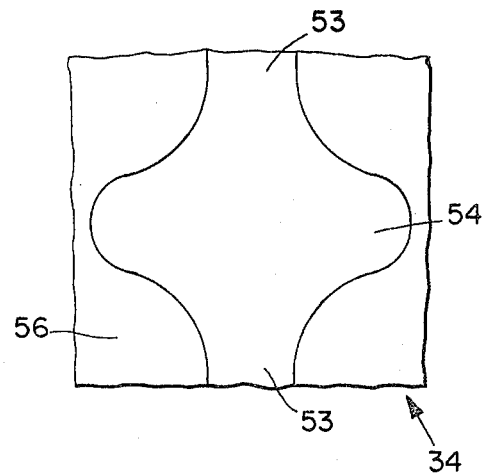
FIG. 3 is an even more greatly enlarged scale, fragmentary view of a portion of the relief-type bonding pattern shown in FIG. 2.

FIG. 3 is a fragmentary enlarged scale view showing the smoothly curved shape of a wide region 54 of an elongate pattern element 53.

Referring again to FIG. 1, the laminate 50 energing from between ultrasonic horn 25 and anvil cylinder 29 is subjected to post-bonding compression by means 38.

Post-bonding compression means 38, FIG. 1, comprises a pressure roll 90, a lever arm 91, and actuator 92, and an adjustable innermost-travel-stop means 93 comprising an adjustment bolt 94. The lever arm 91 is rotatably mounted on pivot pin 95, the rod 96 of actuator 92 is pinned to the lever arm by pivot pin 97; the base of the actuator 92 is pivotally connected to the frame of the apparatus by pivot pin 98, and the pressure roll 90 is rotatably secured to the lever arm 91 by shaft 99. In operation, the actuator 92 is powered to bias the pressure roll 90 towards the anvil cylinder with a predetermined but adjustable force; and the adjustment bolt 94 is adjusted to provide a touching but not pressure loaded contact between the pressure roll 90 and pattern bearing portions of the anvil cylinder in the absence of a laminate 50. Thus, the bonded regions of a laminate will be subjected to the full predetermined force but the pattern elements of the anvil roll will be protected against high pressure, steel-to-steel contact.

Figure 4:
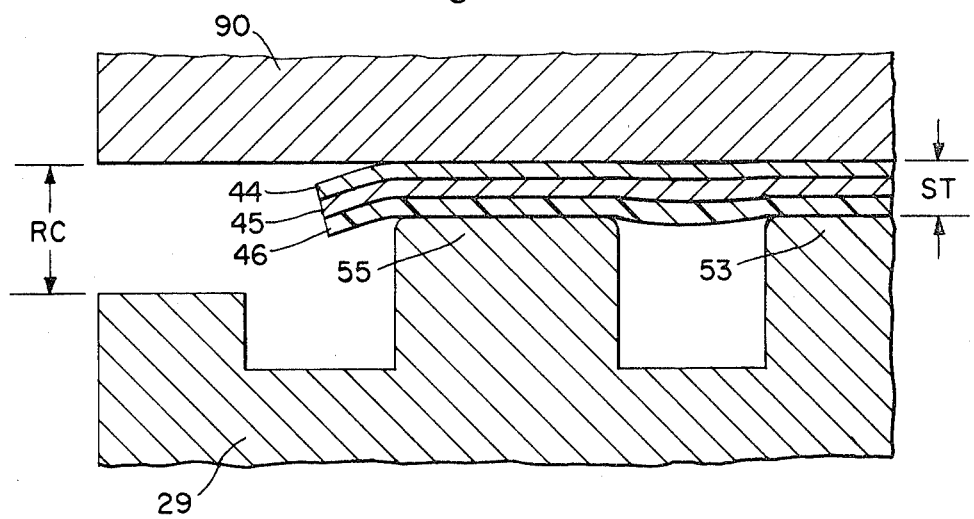
FIG. 4 is a fragmentary, enlarged scale view taken along line 4—4 of FIG. 2.

FIG. 4 shows, in enlarged scale, fragmentary portions of pressure roll 90 and anvil cylinder 29 with webs 44, 45 and 46 disposed between pattern elements 53 and 55 of the anvil cylinder 29 and the pressure roll 90. The running clearance RC is greater than the sum ST of the thickness of the webs to enable the stop means described hereinabove to be adjusted to provide a contacting but not pressure loaded relation between the pressure roll 90 and the elements 53 and 55 in the absence of webs 44, 45 and 46 (i.e., laminate 50) of an exemplary trilaminate 50. For example, a trilaminate comprising a non-woven polyester web 44, an elastomeric web 45 (e.g., a butadiene/styrene copolymer), and a polyethylene web 46 having, respectively, nominal uncompressed thicknesses of about eighteen-hundredths of a millimeter, four-hundredths of a millimeter, and three-hundredths of a millimeter; and in which laminate the elastomeric web 45 is elongated about one-hundred percent while being bonded. Such a resulting elasticized trilaminate is useful, for example, as elasticized garment cuffs.

In an exemplary embodiment of apparatus 20 having a tool steel anvil having a diameter of about thirty centimeters, a steel pressure roll having a diameter of about seven-and-one-half centimeters was provided and was biased with a force of up to about forty kilograms per lineal centimeter of machine width (i.e., the axial length of the pressure roll). By virtue of being steel, this pressure roll was substantially non-deformable when so biased. Thus, the biasing force—the post-bonding compression force—was limited to the bonded regions of the laminate disposed between the pattern elements on the anvil cylinder and the pressure roll. The non-deformability of the pressure roll is provided for the purpose of substantially avoiding cutting of the webs along the relatively sharp edges of the pattern elements which cutting would probably be precipitated by a substantially deformable pressure roll.

While not intending to be bound by a theory of operation, it is believed that such a post-bonding compression is especially effective for laminates comprising a nonwoven fibrous thermoplastic web because it causes the fibers thereof to be virtually imbedded in the next adjacent web (i.e., the elastomeric web in the exemplary trilaminate described hereinabove).

The post-bonding compression described above enables the apparatus operator some latitude in setting the biasing force for the ultrasonic horn (i.e., actuator 31) and the biasing force for the pressure roll (i.e., actuator 92) to precipitate bonds having satisfactory peel strengths. That is, generally speaking, horn biasing may be lowered if pressure roll bias is increased. Inasmuch as high horn bias can precipitate perforations, or high rate of wear of the horn-face, or other undesirable effects, the pressure roll bias enables the apparatus operator to maintain a non-deleterious low level of horn bias and still achieve satisfactory bonds by applying sufficient post-bonding compression.

Figure 5:
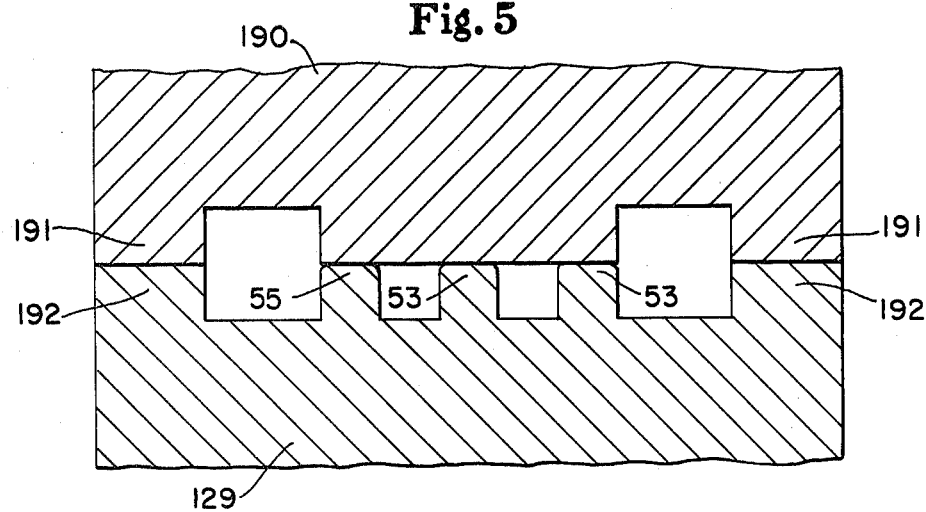
FIG. 5 is a fragmentary sectional view of an alternate embodiment pressure roll/anvil cylinder taken along a transverse plane which extends diametrically through both the pressure roll and a relief-pattern-bearing portion of the anvil cylinder, and which plane passes through the nip formed by the roll and the cylinder.
Figure 6:
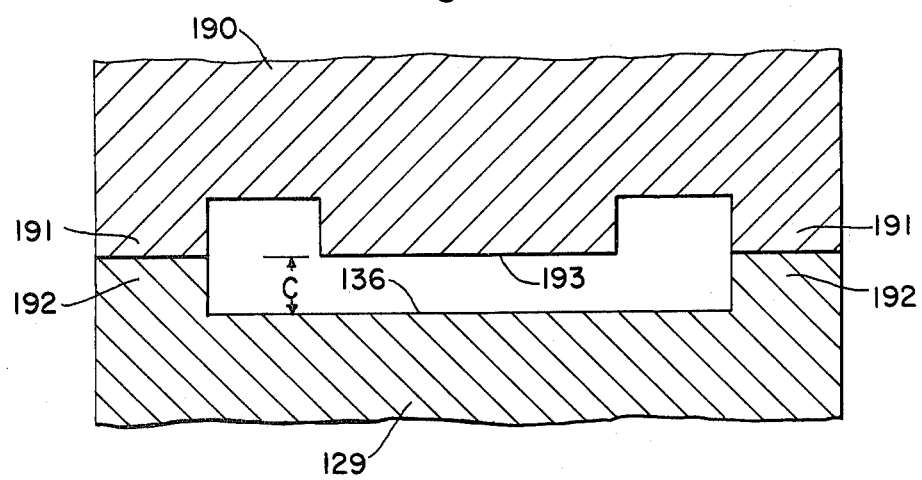
FIG. 6 is a fragmentary sectional view of the alternate pressure roll/anvil cylinder of FIG. 5 and is identical thereto except the anvil cylinder has been rotated sufficiently to present an unpatterned surface area thereof at the nip.

Referring now to FIG. 5, an alternate embodiment pressure roll/anvil cylinder relationship is shown to comprise pressure roll 190 and anvil cylinder 129. Whereas the adjustment means 93, FIG. 1, is stationary, the alternate configuration provides, in the absence of laminate 50, a continuous rolling-contact along the circular cylindrical edge portions 191 and 192 of, respectively, the pressure roll 190 and the anvil cylinder 129. Thus, the alternate embodiment post-bonding compression means do not have an adjustable inner stop, but do continuously provide rotational energy to the pressure roll from the driven anvil cylinder while passing both the pattern element bearing portions and the non-pattern bearing portions of the anvil cylinder as shown in FIGS. 5 and 6, respectively, in the absence of laminate 50; and with or without a laminate passing therethrough albeit, when a laminate is present the rotational energy for the pressure roll is transmitted via the laminate. Moreover, as shown in FIG. 6, a clearance is present between the post-bonding compression surface 193 of the pressure roll 190 and the non-patterned portion 136 of anvil cylinder 129 (which is, as shown, equal to the radial height of the pattern elements 53 shown in FIG. 5).

While particular embodiments of the present invention have been illustrated and described, it would be obvious to those skilled in the art that various other changes and modifications can be made without departing from the spirit and scope of the invention. It is intended to cover in the appended claims all such changes and modifications that are within the scope of this invention.

What is claimed is:

1. An improved ultrasonic web laminating apparatus which apparatus includes an ultrasonic horn and a rotating anvil cylinder between which a plurality of webs which are subject to ultrasonic bonding are bonded as they are forwarded therebetween and thereby converted into a laminated web, said improvement comprising a pressure roll disposed adjacent the downstream edge of the ultrasonic horn, and means for biasing the pressure roll towards the anvil cylinder to apply a post-bonding compression to said laminated web prior to the ultrasonic bonded regions thereof becoming fully set upon cooling, and prior to said laminated web being disassociated from the anvil cylinder.

2. The apparatus of claim 1 wherein the anvil cylinder has a relief-type pattern disposed on its periphery to effect pattern bonding of said webs, said relief type pattern comprising radially outwardly extending elements having a sufficient radial height to preclude said means from applying post-bonding compression to the non-bonded regions of the laminated web.

3. The apparatus of claim 2 wherein said pressure roll comprises a substantially non-deformable pressure bearing surface.

4. The apparatus of claim 2 further comprising stop means for limiting the freedom of travel of the inwardly biased pressure roll to provide, in the absence of said webs, a non-pressure loaded contacting relation between said pressure roll and said pattern elements.

5. The apparatus of claim 4 wherein said stop means are adjustable and stationary.

6. The apparatus of claim 4 wherein said stop means comprises circular cylindrical end portions of both the pressure roll and the anvil cylinder which end portions are configured to continuously be in rolling contact except when a said laminated web is disposed between said pressure roll and said pattern elements.

7. An improved method of dynamically ultrasonically bonding a plurality of webs to form a laminate thereof which method includes the step of ultrasonically bonding the webs together as they are forwarded between an ultrasonic horn and an anvil, said improvement comprising the step of applying a post-bonding compression force to the ultrasonically bonded regions of the laminate before the ultrasonically formed bonds become fully set upon cooling, and prior to the laminate being disassociated from the anvil.

8. The method of claim 7 wherein said laminate is ultrasonically pattern bonded, and said post-bonding compression is applied to only the ultrasonically bonded regions of said laminate.

* * * * *